UNITED STATES PATENT OFFICE.

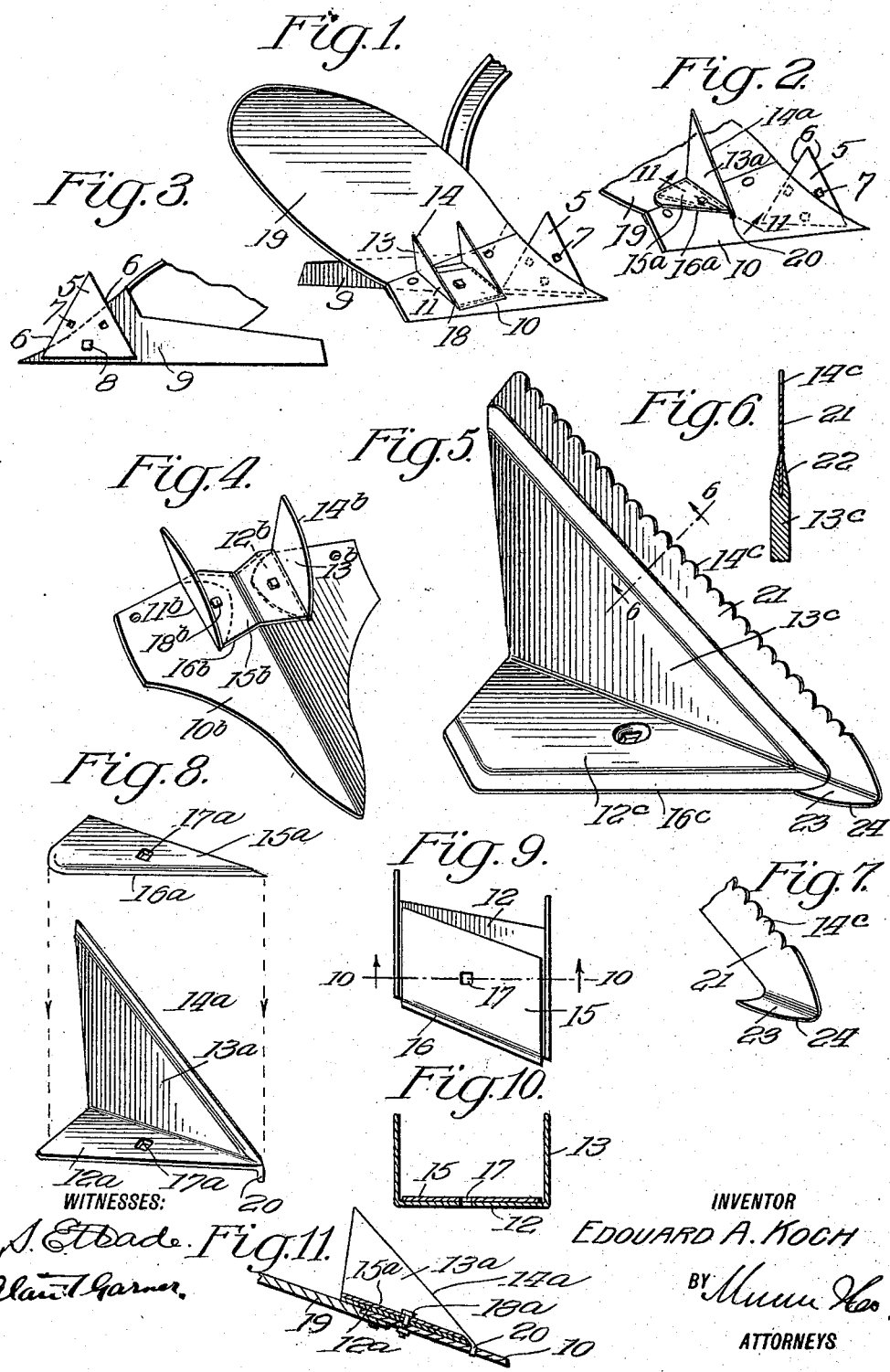

EDOUARD ALPHONSE KOCH, OF PLAQUEMINE, LOUISIANA.

PLOW ATTACHMENT.

1,188,184.  Specification of Letters Patent.  Patented June 20, 1916.

Application filed July 24, 1915. Serial No. 41,745.

*To all whom it may concern:*

Be it known that I, EDOUARD A. KOCH, a citizen of the United States, and a resident of Plaquemine, in the parish of Iberville and State of Louisiana, have invented certain new and useful Improvements in Plow Attachments, of which the following is a specification.

One of the main objects of the invention is to provide a plow with cutters or blades made of a strong thin material adapted to remain sharp until worn out, and adapted to be duplicated at a minimum cost, whereby the old method of equipping plows with colters, which as well known, have to be sharpened every time the share is sharpened, may be done away with.

A principal object of my invention is to provide means in the nature of blades or cutters adapted to be attached to a plowshare in such manner as to cut the slice of earth turned up by the mold board into ribbons whereby to pulverize the same contemporaneously with the plowing operation, the blades being so arranged as not to interfere with the overturning of the slice of earth by the moldboard.

A further object of the invention is to provide an attachment of the type set out in the nature of a plurality of cutting blades connected with the plowshare and adapted to travel beneath the surface of the earth for ribboning the slice as the latter is turned over whereby it will be disintegrated as it falls from the moldboard of the plow.

With these and other objects in view which will become apparent as the description proceeds the invention resides in the construction, combination, and arrangement of parts hereinafter more fully described and claimed, and illustrated in the accompanying drawings in which like reference characters indicate like parts throughout the several figures, of which—

Figure 1 represents a view in elevation of a plow provided with a plurality of attachments constructed according to my invention. Fig. 2 represents a fragmentary elevational view showing the manner of arrangement of a modified form of the device. Fig. 3 represents an elevational view of a plow looking at the same from the land side thereof, showing the manner of attaching the triangular shaped cutting blade. Fig. 4 represents a perspective view of a double share having a double cutting knife attached thereto. Fig. 5 represents a perspective view of a modified form of cutting device. Fig. 6 represents a view in section taken vertically and transversely on the plane indicated by the line 6—6 of Fig. 5. Fig. 7 represents a fragmentary view in perspective of the blade utilized in connection with the modified form shown in Fig. 5. Fig. 8 represents a composite perspective view of one of the forms which my invention may attain. Fig. 9 represents a plan view of the form of double blade which is shown as attached to the plowshare in Fig. 1. Fig. 10 represents a vertical sectional view taken on the plane indicated by the line 10—10 of Fig. 9. Fig. 11 represents a sectional view taken on the plane indicated by the line 11—11 of Fig. 2.

The invention does not limit the use of the cutting blades or knives with plows, but contemplates the provision of various tilling implements with the cutters, and for this reason the blades may be made in various different shapes in accordance with the particular type and form of implement with which they are to be used.

One of the forms which the device may take is that of a triangular plate 5 as indicated in Figs. 1, 2, and 3, which plate is sharpened along all three edges 6 and is provided with a plurality of openings 7 for the reception of suitable fastening means such as bolts 8 whereby the plate may be secured to the land side 9 of a plow. To the plowshare 10 as indicated in Fig. 1, is secured a double cutter indicated generally by the numeral 11. This cutter is illustrated in detail in Figs. 9 and 10 and includes a flat base 12 from whose lateral edges rise the vertical plates 13. The latter are substantially triangular in shape and along their forward cutting edges 14 are sharpened. Arranged upon the upper surface of base 12 and between the blades 13, is a retaining plate 15. The latter is sharpened along its forward edge 16, which edge slightly overlies the forward edge of base 12 and extends down upon the adjacent surface of the plowshare 10 in order that no resistance will be offered as the plow moves along. It will be noted that base 12, together with the retaining plate 15, is substantially diamond shaped, so that when the device is in position, the cutting blades 13 will not lie in alinement with each other transversely of the plowshare, but will be disposed one in advance of the other, in order that the strain upon the blades will be taken up in succession, and in order that earth will not be wedged and packed between them during the operation of the device. Plate 15 and base 12 are provided with alining openings at 17 for the reception of suitable fastening means 18, see Fig. 1, whereby the device may be secured in position upon the plowshare. It will be noted that the cutter is arranged adjacent the rear edge of the plowshare and slightly overhangs and bears upon the moldboard 19 of the plow. The blades 13 as has been stated, are arranged obliquely with respect to the plowshare, and it will be noted that the triangular plate 5 in Fig. 1 is arranged in the same oblique line with blades 13 for the purpose already stated.

In Fig. 2 a single blade cutter is used in connection with the triangular cutter 5, and includes as shown in detail in Fig. 8, a triangular base $12^a$ from one of whose lateral edges rises a blade $13^a$ having a sharpened upper cutting edge $14^a$. At the forward apex of base $12^a$, depends a lug 20 adapted to engage in an opening in the plowshare in the manner indicated in Fig. 2 for anchoring the forward portions of the cutter. A triangular retaining plate $15^a$ is used in connection with this form of cutter and is adapted to rest upon the base $12^a$. The retaining plate $15^a$ similarly with plate 15 is provided with a forward sharpened edge $16^a$ which slightly overlies the forward edge of base $12^a$, and rests upon the adjacent surface of the plowshare. Base $12^a$ and plate $15^a$ are provided with registering openings $17^a$ for the reception of suitable retaining means $18^a$ in the nature of a bolt, screw, or other device. As will be noted from Fig. 2, the cutter blades $13^a$ and 5 are arranged in an oblique line relatively to the direction of movement of the plow.

The use of the invention in connection with a double share is indicated in Fig. 4, wherein $10^b$ designates the share and $11^b$ designates generally the cutter. The arrangement of the cutters, it will be noted, is somewhat similar to the arrangement of the double cutters shown in Fig. 1. Each of these cutters includes the substantially triangular base $12^b$ from one lateral side whereof rises the cutter blade $13^b$. It is provided with a forward sharpened cutting edge $14^b$. The retaining plate $15^b$ is in the nature of a double retaining plate and is disposed upon the base $12^b$ and is provided with a forward sharpened edge $16^b$ which lies upon the share $10^b$ on opposite sides of the central longitudinal line thereof. The retaining plate $15^b$ together with the bases $12^b$ are provided with openings for the reception of retaining elements $18^b$. The rear edge of plate $15^b$ is centrally recessed or cut away in the form indicated, so as to follow the contour of the rear edge of the share $10^b$.

In Figs. 5, 6, and 7 a form of cutter is disclosed which may be utilized in a manner similar to that form indicated in Figs. 2, 8, and 11. The cutter includes the base $12^c$ of relatively thick heavy metal having a sharpened forward cutting edge $16^c$ which is adapted to lie close against the adjacent surface of the plowshare. In this modification of the device, no retaining plate is necessary, since the body portion of the cutter is formed of heavy material. From one lateral edge of base $12^c$ rises the plate $13^c$, which plate along its upper edge is split or bifurcated for the reception of a blade 21. This upper edge is beveled off toward the blade as indicated at 22 (see Fig. 6) so as to offer the least resistance as the blade travels through the slice of earth. This blade 21 is provided with an upper scalloped or corrugated cutting edge $14^c$. The lower end of blade 21 is bent outwardly as at 23 and is returned around the forward apex of base $12^c$, in order to retain the blade against displacement from its seat through the action of earth in engaging upon the blade as the plow moves along. This hooked portion may, similarly to base $12^b$, be provided with a sharpened forward edge 24. The advantage attained by this construction is that the blade 21 when it becomes worn out, may be removed from the main body portion of the device a new blade substituted, at a minimum cost, without removing the body portion of the cutter from the plowshare.

The device in whatever form it may assume, and whether used with a plow or with some other tilling implement, travels along just beneath the surface of the earth so as to ribbon the slice of earth as it is being cut out, so that as it falls beside the furrow it will be broken up and disintegrated. By this arrangement, the ordinary objections to a surface cutter are done away with, since the blade does not engage with the roots and vegetation ordinarily found on the upper surface of the slice of earth being turned out.

Although I have described the preferred embodiment of my invention, I may desire to make such changes in the construction, combination, and arrangement of parts thereof as do not depart from the spirit of the invention and the scope of the appended claims.

It will be noted that the blades or knives may be attached and taken off of the plow or other tilling implement, without injury to the share.

I claim:—

1. In a device of the class described, the combination with a tilling implement, of a plurality of cutters arranged in spaced relation to each other thereon and each comprising a relatively flat base portion connected with the implement and having a forward edge extending rearwardly at an obtuse angle with the line of movement of the implement, and a cutter portion extending upwardly at an angle to the base portion and provided with a forwardly inclined cutting edge, means for fastening the base portions to the implement, and lugs provided adjacent the forward corners of the base portions and engaging in recesses provided in the tilling implement.

2. In a device of the class described, the combination with a plow, of a cutter including a base plate secured to the plowshare and having a rearwardly extending sharpened edge, a blade arising from the base at substantially right angles therewith and having its upper edge sharpened and extending backwardly at an angle with the plowshare, the cutting edges of the base and blade meeting at a point at the forward end of the cutter.

3. In a device of the class described, the combination with a plow, of a cutter arranged thereon and including a substantially triangular base portion having its forward edge sharpened, a blade arising from the base portion, a cutting edge carried on the upper edge of the blade and inclining rearwardly and upwardly at an angle, said cutting edge having a forward hooked portion engaging around the apex of the base, said hooked portion having its forward edge sharpened.

EDOUARD ALPHONSE KOCH.

Witnesses:
  L. G. LORIO,
  CHAS. E. GRACE.

Copies of this patent may be obtained for five cents each, by addressing the "Commissioner of Patents, Washington, D. C."